UNITED STATES PATENT OFFICE.

GEORGE W. POWELL, OF CHINESE CAMP, CALIFORNIA.

IMPROVED FIRE-PROOF PAINT.

Specification forming part of Letters Patent No. 40,429, dated October 27, 1863.

*To all whom it may concern:*

Be it known that I, G. W. POWELL, M. D., of Chinese Camp, Toulume county, State of California, have invented a new compound, a useful Improvement in Fire-Proof Paint, and my mode and manner of mixing the ingredients and using them I describe as follows:

I dissolve two and one-half pounds of alum and borax in equal quantities—viz., one and one-fourth pound of each—in boiling water in a glass or porcelain vessel, kept stirred for four or five days until the acid is thoroughly evaporated, so that it is freed of the acid that would otherwise injure the paint. Then evaporate the water until the borax and alum are again crystallized. It is then very finely pulverized and added to ten pounds of white lead and well mixed and thinned with spirits of turpentine or camphene. I use also a small quantity of boiled linseed-oil to be added occasionally, just enough to prevent the paint from rubbing off when dry. I cover the front of the building or wood-work with from four to five coats. It thus prevents the flame from a fire communicating with the wood, and where a large fire is burning the fire burns the wood on the inside of the paint, and the flame will not spread over the paint on the outside. The burning is therefore confined and very slow, and easily extinguished.

A building painted on the inside, or its cupboards or closets painted with this composition, cannot be fired by the flame of a lamp or candle. The smoke, too, from the fire of a building covered with this composition will not increase the flame, but it is more like the steam from burning green wood, and really assits in smothering out the fire.

What I claim as my invention, and desire to secure by Letters Patent, is—

The compound for making fire-proof paint in the manner herein described.

GEORGE W. POWELL.

Witnesses:
 J. FRANKLIN REIGART,
 JOHN S. HOLLINGSHEAD.